US012675867B2

(12) United States Patent (10) Patent No.: US 12,675,867 B2
Li et al. (45) Date of Patent: Jul. 7, 2026

(54) METHOD AND DEVICE FOR DETECTING NUMBER OF TABS

(71) Applicant: CONTEMPORARY AMPEREX TECHNOLOGY (HONG KONG) LIMITED, Hong Kong (CN)

(72) Inventors: Lu Li, Ningde (CN); Guannan Jiang, Ningde (CN); Zhiyu Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 383 days.

(21) Appl. No.: 18/230,445

(22) Filed: Aug. 4, 2023

(65) Prior Publication Data

US 2024/0104713 A1 Mar. 28, 2024

Related U.S. Application Data

(63) Continuation of application No. PCT/CN2023/085207, filed on Mar. 30, 2023.

(30) Foreign Application Priority Data

Sep. 27, 2022 (CN) .......................... 202211182458.4

(51) Int. Cl.
*G06T 7/60* (2017.01)
*G06T 7/00* (2017.01)
(52) U.S. Cl.
CPC .............. *G06T 7/0006* (2013.01); *G06T 7/60* (2013.01); *G06T 2207/30108* (2013.01); *G06T 2207/30242* (2013.01)

(58) Field of Classification Search
CPC ..................... G06T 7/0006; G06T 7/60; G06T 2207/30108; G06T 2207/30242; G06T 2207/30164; G06T 7/0008; Y02E 60/10
USPC .................................................. 382/141, 100
See application file for complete search history.

(56) References Cited

FOREIGN PATENT DOCUMENTS

| | | | |
|---|---|---|---|
| CN | 108198150 A | 6/2018 | |
| CN | 112525917 A * | 3/2021 | .......... H01M 4/0404 |
| CN | 113252698 A | 8/2021 | |
| CN | 113378743 A | 9/2021 | |
| CN | 113506957 A | 10/2021 | |
| CN | 113720282 A | 11/2021 | |
| CN | 114494469 A | 5/2022 | |

(Continued)

OTHER PUBLICATIONS

The World Intellectual Property Organization (WIPO) International Search Report and Written Opinion for PCT/CN2023/085207 Jun. 15, 2023 17 pages (including English translation).

(Continued)

*Primary Examiner* — Sheela C Chawan
(74) *Attorney, Agent, or Firm* — ANOVA LAW GROUP, PLLC

(57) ABSTRACT

A method for detecting a number of tabs includes determining a pixel value of a first target pixel based on at least one pixel value of at least one first adjacent pixel adjacent to a first target pixel on a tab framework, and determining the number of tabs based on the pixel value of the first target pixel. Each of the at least one first adjacent pixel is an adjacent pixel of the first target pixel on a side in a first direction on the tab framework.

12 Claims, 4 Drawing Sheets

<u>200</u>

Determine a pixel value of a first target pixel based on a pixel value of at least one first adjacent pixel adjacent to a first target pixel on a tab framework, where the first adjacent pixel is an adjacent pixel of the first target pixel on a side oriented toward a first direction on the tab framework — 210

Determine the number of tabs based on the pixel value of the first target pixel — 220

(56)                    References Cited

FOREIGN PATENT DOCUMENTS

| CN | 115841451 | A | 3/2023 |
|----|-----------|---|--------|
| IN | 114022479 | A | 2/2022 |
| KR | 20220087027 | A | 6/2022 |
| WO | 2021169335 | A1 | 9/2021 |

OTHER PUBLICATIONS

The China National Intellectual Property Administration (CNIPA)
The First Office Action for Chinese Application 202211182458.4
Jun. 2, 2023 12 Pages (With Translation).
The European Patent Office (EPO) Extended Search Report for EP
Application No. 23742177.1 Aug. 14, 2024, 8 Pages.

\* cited by examiner

200

METHOD AND DEVICE FOR DETECTING NUMBER OF TABS

CROSS-REFERENCE TO RELATED APPLICATIONS

This application is a continuation of International Application No. PCT/CN2023/085207, filed on Mar. 30, 2023, which claims priority to Chinese Patent Application No. 202211182458.4, filed with the National Intellectual Property Administration, PRC on Sep. 27, 2022 and entitled "METHOD AND DEVICE FOR DETECTING NUMBER OF TABS", which are incorporated herein by reference in their entirety.

TECHNICAL FIELD

This application relates to the technical field of batteries, and in particular, to a method and device for detecting the number of tabs.

BACKGROUND

With the development of science and technology, quality check of industrial products in more and more fields is implemented using computer image processing technology. In the field of battery technology, products in a battery production process may also be inspected using the computer image processing technology.

In the battery production process, detection of defects of a battery tab is crucial. The accuracy of the number of tabs of a battery is conducive to accurately determining the pass rate of batteries and ensuring high safety performance of the batteries. Therefore, how to detect the number of tabs accurately is still a problem to be solved.

SUMMARY

This application provides a method and device for detecting the number of tabs to ensure accuracy of detecting the number of tabs.

According to a first aspect, a method for detecting the number of tabs is provided, including: determining a pixel value of a first target pixel based on a pixel value of at least one first adjacent pixel adjacent to a first target pixel on a tab framework, where the first adjacent pixel is an adjacent pixel of the first target pixel on a side in a first direction on the tab framework; and determining the number of tabs based on the pixel value of the first target pixel.

In an embodiment of this application, the number of tabs represented by the first target pixel is determined based on the pixel value of the first adjacent pixel. In this way, even if the tabs adhere to each other, the tabs can still be counted accurately, thereby ensuring accuracy of the detected number of tabs. By comparing the detected number of tabs with a preset number of tabs, a defect of tab folding into an electrode assembly and a defect of tab shortage can be detected, thereby ensuring a high pass rate of manufactured batteries. In addition, in a case of many tabs adhering to each other, the accurate number of tabs detected can avoid miscounting a qualified battery as unqualified due to an inaccurate detection result, thereby reducing the overkill rate in a defect detection process on the basis of ensuring high quality of manufactured batteries.

In some embodiments, the determining a pixel value of a first target pixel based on a pixel value of at least one first adjacent pixel adjacent to a first target pixel on a tab framework includes: using a sum of pixel values of the at least one first adjacent pixel as the pixel value of the first target pixel.

By adding up the pixel values of all the first adjacent pixels, it is ensured that the pixel value of the first target pixel represents the actual number of tabs. Especially, in a case that the pixel value of the first adjacent pixel is greater than 1, the technical solution hereof avoids inaccuracy of detected number of tabs caused by miss detection of stuck tabs, and reduces the overkill rate in a defect detection process on the basis of ensuring high quality of manufactured batteries.

In some embodiments, the determining the number of tabs based on the pixel value of the first target pixel includes: obtaining at least one tab calculation value, where the tab calculation value is a sum of pixel values of the first target pixels in a second direction, and the second direction is perpendicular to the first direction; and determining the number of tabs based on a maximum tab calculation value among the at least one tab calculation value.

In this way, the inaccurate counting of the tabs caused by the adhesion of tabs is avoided, and the accuracy of the detected number of tabs is improved.

In some embodiments, the first target pixel is an intersection on the tab framework. The method further includes: assigning a value of 0 to the first adjacent pixel in a case that a framework branch containing the first adjacent pixel is not a tab.

The pixel value of the first adjacent pixel is counted in the number of tabs only when it is determined that the framework branch containing the first adjacent pixel is a tab, so that glitches caused by optical factors, foreign matters, or other reasons are prevented from affecting the tab count result, thereby improving the accuracy of defect detection of the tabs.

In some embodiments, the method further includes: determining a first length by which the framework branch containing the first adjacent pixel extends along the first direction; determining, in a case that the first length is greater than or equal to a first threshold, that the framework branch containing the first adjacent pixel is a tab; or, determining, in a case that the first length is less than a first threshold, that the framework branch containing the first adjacent pixel is not a tab.

The determining, based on the first length, whether the framework branch containing the first adjacent pixel is qualified to represent a tab can simply and quickly exclude the glitches on the tab framework, avoid counting the glitches into the number of tabs, and ensure accuracy of the detected number of tabs.

In some embodiments, the first direction is a negative direction of an abscissa axis. The determining a first length by which the framework branch containing the first adjacent pixel extends along the first direction includes: increasing the first length by 1 in a case that pixels adjacent to the first adjacent pixel include a third adjacent pixel, and using the third adjacent pixel as a next first adjacent pixel, where an abscissa of the third adjacent pixel is less than or equal to an abscissa of the first adjacent pixel, and a pixel value of the third adjacent pixel is 1; and obtaining the first length between the first adjacent pixel and the first target pixel in a case that the pixels adjacent to the first adjacent pixel include no third adjacent pixel.

In this way, the length by which the framework branch containing the first adjacent pixel extends along the first direction can be obtained by a simple cyclic process, thereby improving the efficiency of detecting the number of tabs.

In some embodiments, the first direction is a negative direction of an abscissa axis. The determining whether the framework branch containing the first adjacent pixel is a tab includes: determining a second length between a third adjacent pixel and the first adjacent pixel, where the third adjacent pixel is adjacent to the first adjacent pixel, an abscissa of the third adjacent pixel is less than or equal to an abscissa of the first adjacent pixel, and a pixel value of the third adjacent pixel is 1; and using the third adjacent pixel as a next first adjacent pixel in a case that the second length is less than a second threshold and pixels adjacent to the first adjacent pixel include the third adjacent pixel; and determining, in a case that the second length is less than a second threshold and the pixels adjacent to the first adjacent pixel include no third adjacent pixel, that the framework branch is not a tab; and, determining, in a case that the second length is greater than or equal to the second threshold, that the framework branch is a tab.

In these embodiments of this application, without a need to traverse all the pixels on the tab framework, it is determined whether the framework branch containing the pixel adjacent to the first target pixel represents a tab, thereby reducing the number of cycles, saving the time of data processing, and improving the efficiency of detecting the number of tabs.

In some embodiments, the method further includes: using a second adjacent pixel adjacent to the first target pixel on the tab framework as a next first target pixel, where the second adjacent pixel is an adjacent pixel of the first target pixel on a side in a third direction on the tab framework; and the third direction is parallel to the first direction and opposite to the first direction.

By using the second adjacent pixel as the next first target pixel, the pixels on the tab framework are detected sequentially along the third direction. In this way, the number of tabs located on one side of the first target pixel in the first direction can be counted cumulatively into a pixel on the framework branch containing the second adjacent pixel, thereby improving the accuracy of the detected number of tabs. In addition, by traversing all the pixels on the tab framework except intersections, the number of tabs represented by the pixel value of each pixel on the tab framework is the actual number of tabs, thereby ensuring the accuracy of the detected number of tabs. In addition, in a case that some tabs adhere to each other, the number of tabs that "merge into" the first target pixel is counted into the number of tabs of a second adjacent pixel that "flow out" of the first target pixel point, thereby ensuring the accuracy of the detected number of tabs.

In some embodiments, the third direction is a positive direction of an abscissa axis. An abscissa of the second adjacent pixel is greater than or equal to an abscissa of the first target pixel.

In these embodiments of this application, the orientation of a pixel can be determined based on the value of the abscissa. In a process of traversing the pixels, the pixels can be traversed along a specific direction, so that the pixel value of the pixel on the tab framework represents the actual number of tabs, thereby improving the accuracy of detecting the number of tabs.

According to a second aspect, a device for detecting the number of tabs is provided. The device includes a processing module. The processing module is configured to: determine a pixel value of a first target pixel based on a pixel value of at least one first adjacent pixel adjacent to a first target pixel on a tab framework, where the first adjacent pixel is an adjacent pixel of the first target pixel on a side in a first direction on the tab framework. The processing module is further configured to determine the number of tabs based on the pixel value of the first target pixel.

In some embodiments, the processing module is configured to use a sum of pixel values of the at least one first adjacent pixel as the pixel value of the first target pixel.

In some embodiments, the processing module is configured to obtain at least one tab calculation value, where the tab calculation value is a sum of pixel values of the first target pixels in a second direction, and the second direction is perpendicular to the first direction. The processing module is further configured to determine the number of tabs based on a maximum tab calculation value among the at least one tab calculation value.

In some embodiments, the processing module is configured to assign a value of 0 to the first adjacent pixel in a case that a framework branch containing the first adjacent pixel is not a tab.

In some embodiments, the processing module is configured to determine a first length by which the framework branch containing the first adjacent pixel extends along the first direction. The processing module is further configured to determine, in a case that the first length is greater than or equal to a first threshold, that the framework branch containing the first adjacent pixel is a tab; or, the processing module is configured to determine, in a case that the first length is less than a first threshold, that the framework branch containing the first adjacent pixel is not a tab.

In some embodiments, the processing module is configured to increase the first length by 1 in a case that pixels adjacent to the first adjacent pixel include a third adjacent pixel, and use the third adjacent pixel as a next first adjacent pixel, where an abscissa of the third adjacent pixel is less than or equal to an abscissa of the first adjacent pixel, and a pixel value of the third adjacent pixel is 1. The processing module is further configured to obtain the first length between the first adjacent pixel and the first target pixel in a case that the pixels adjacent to the first adjacent pixel include no third adjacent pixel.

In some embodiments, the processing module is configured to determine a second length between a third adjacent pixel and the first adjacent pixel, where the third adjacent pixel is adjacent to the first adjacent pixel, an abscissa of the third adjacent pixel is less than or equal to an abscissa of the first adjacent pixel, and a pixel value of the third adjacent pixel is 1. The processing module is further configured to use the third adjacent pixel as a next first adjacent pixel in a case that the second length is less than a second threshold and pixels adjacent to the first adjacent pixel include the third adjacent pixel. The processing module is further configured to determine, in a case that the second length is less than a second threshold and the pixels adjacent to the first adjacent pixel include no third adjacent pixel, that the framework branch is not a tab. The processing module is further configured to determine, in a case that the second length is greater than or equal to the second threshold, that the framework branch is a tab.

In some embodiments, the processing module is configured to use a second adjacent pixel adjacent to the first target pixel on the tab framework as a next first target pixel. The second adjacent pixel is an adjacent pixel of the first target pixel on a side in a third direction on the tab framework. The third direction is parallel to the first direction and opposite to the first direction.

In some embodiments, the third direction is a positive direction of an abscissa axis. An abscissa of the second adjacent pixel is greater than or equal to an abscissa of the first target pixel.

According to a third aspect, a device for detecting a number of tabs is provided, including a processor and a memory. The memory stores an instruction. When executed by the processor, the instruction causes the device to perform the method according to any one of the embodiments in the first aspect.

According to a fourth aspect, a computer-readable storage medium is provided. The computer-readable storage medium stores a computer program. When executed, the computer program performs the method according to any one of the embodiments in the first aspect.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
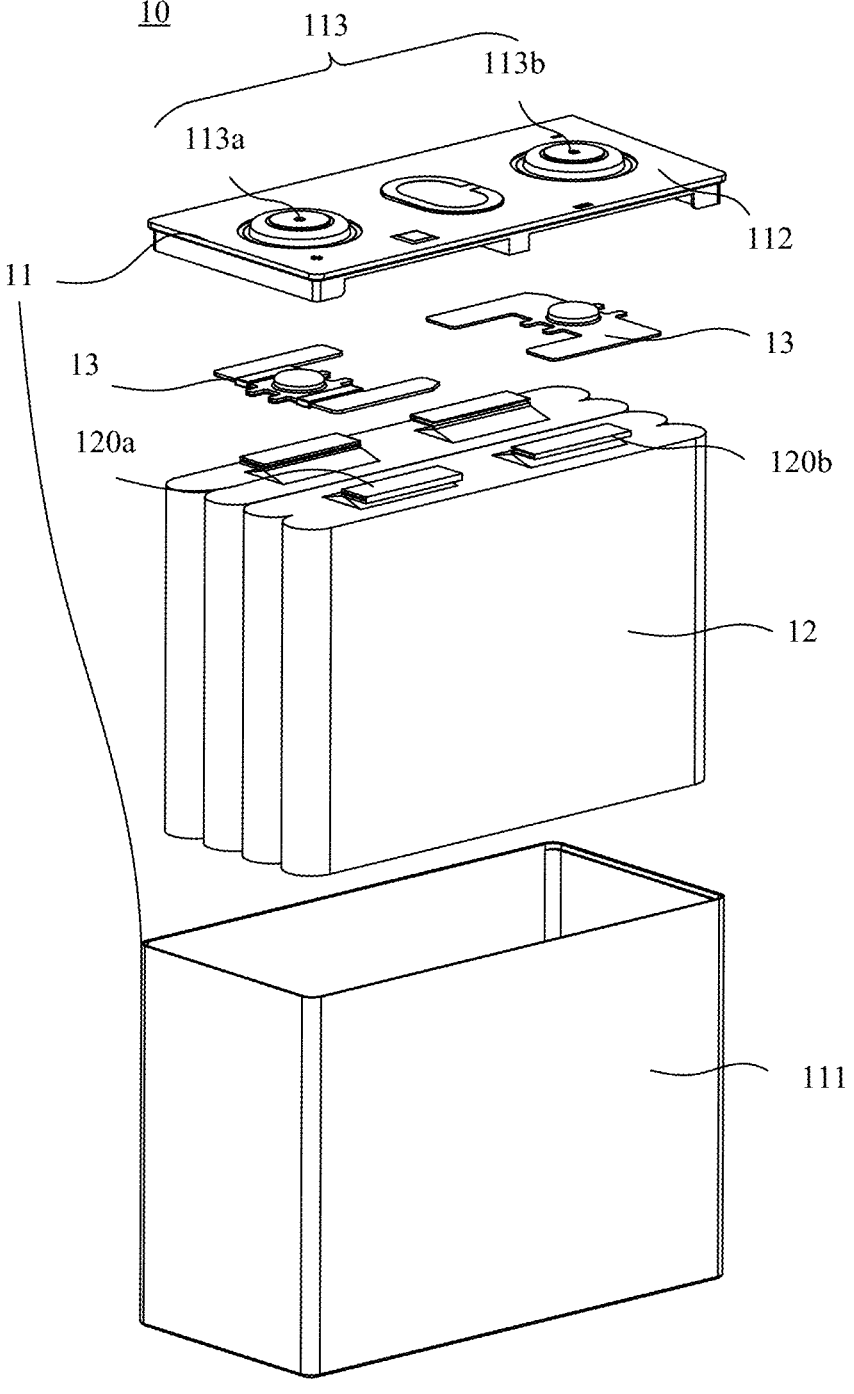
FIG. 1 is a schematic exploded view of a battery cell according to an embodiment of this application.

The drawings are not necessarily drawn to scale.

DETAILED DESCRIPTION OF EMBODIMENTS

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned device or component is necessarily located in the specified direction or constructed or operated in the specified direction. Therefore, such terms are not to be understood as a limitation on this application. In addition, the terms "first", "second", "third", and so on are merely used for descriptive purposes, but not construed as indicating or implying relative importance. "Perpendicular" does not means exact perpendicularity, but means perpendicularity falling within an error tolerance range. "Parallel" does not mean exact parallelism, but means parallelism falling within an error tolerance range. All technical and scientific terms used herein have the same meanings as what is normally understood by a person skilled in the technical field of this application. The terms used in the specification of this application are merely intended to describe specific embodiments but not intended to limit this application. The terms "include" and "contain" and any variations thereof used in the specification, claims, and brief description of drawings of this application are intended as non-exclusive inclusion.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

In this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

"A plurality of" referred to in this application means two or more (including two). Similarly, "a plurality of groups" means two or more groups (including two groups), and "a plurality of pieces" means two or more pieces (including two pieces).

In embodiments of this application, the same reference numeral denotes the same component. For brevity, detailed descriptions of the same component are omitted in a different embodiment. Understandably, dimensions such as thickness, length, and width of various components in the embodiments of this application shown in the drawings, and dimensions such as overall thickness, length, and width of an integrated device are merely illustrative descriptions, but do not constitute any limitation on this application.

In this application, a battery cell may include a lithium-ion secondary battery, a lithium-ion primary battery, a lithium-sulfur battery, a sodium-lithium-ion battery, a sodium-ion battery, a magnesium-ion battery, or the like, without being limited in embodiments of this application. The battery cell may be in various shapes such as a cylinder, flat body, or cuboid, without being limited in embodiments of this application. Depending on the form of packaging, the battery cell is typically classed into three types: cylindrical battery cell, prismatic battery cell, and pouch-type battery cell. The embodiments of this application do not limit the type of the battery cell.

The battery mentioned in embodiments of this application means a unitary physical module that includes one or more battery cells to provide a higher voltage and a higher capacity. For example, the battery mentioned in this application may include a battery module, a battery pack, or the like. A battery typically includes a box configured to package one or more battery cells. The box prevents liquid or other foreign matters from affecting the charging or discharging of the battery cells.

A battery cell includes an electrode assembly and an electrolytic solution. The electrode assembly includes a positive electrode plate, a negative electrode plate, and a separator. The battery cell works primarily by shuttling metal ions between the positive electrode plate and the negative electrode plate. The positive electrode plate includes a positive current collector and a positive active material layer. A surface of the positive current collector is coated with the positive active material layer. Of the positive current collector, a part uncoated with the positive active material layer protrudes from a part coated with the positive active material layer. The part, uncoated with the positive active material layer, of the positive current collector, serves as a positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material layer. The negative active material layer is coated on a surface of the negative current collector. Of the negative current collector, a part uncoated with the negative active material layer protrudes from a part coated with the negative active material layer. The part, uncoated with the negative active material layer, of the negative current collector, serves as a negative tab. The negative current collector may be made of copper, and a negative active material may be carbon, silicon, or the like. In order to ensure passage of a large current without fusing off, the positive tab is plural in number, and the plurality of positive tabs are stacked together; the negative tab is plural in number, and the plurality of negative tabs are stacked together. The separator may be made of a material such as polypropylene (PP) or polyethylene (PE). In addition, the electrode assembly may be of a jelly-roll type structure or a stacked type structure, without being limited herein.

In a production process of a battery cell, equality between an actual number of tabs and a preset number of tabs is an important indicator of quality conformity of the battery cell. For example, if an actual detected number of tabs is less than the preset number of tabs, the battery cell may have incurred a defect of tab folding into an electrode assembly. However, due to the tiny thickness of a tab and the close distance between adjacent tabs, the tabs are prone to adhere to each other. The adhesion between the tabs comes in different circumstances, but the existing method for detecting the number of tabs can hardly distinguish between the adhesion circumstances, thereby obtaining the number of tabs that is not accurate enough.

In a view of the above situation, this application provides a method for detecting a number of tabs. In this method, the number of tabs actually represented by a target pixel is determined based on a value of a pixel adjacent to a target pixel on a tab framework. In this way, even if the tabs adhere to each other, the tabs can still be counted accurately, thereby ensuring accuracy of the detected number of tabs. Further, with the accurate number of tabs detected, the defect of tab folding into an electrode assembly and the defect of tab shortage can be detected, thereby avoiding miscounting a qualified battery as unqualified due to an inaccurate detection result, and in turn, reducing the overkill rate in a defect detection process on the basis of ensuring high quality of manufactured batteries.

The technical solutions according to embodiments of this application are applicable to various battery cells. Using FIG. 1 as an example, FIG. 1 is a schematic exploded view of a battery cell 10 to which an embodiment of this application is applicable.

The battery cell 10 includes one or more electrode assemblies 12, a housing 111, and an end cap 112. The housing 111 and the end cap 112 form a shell or a battery box 11.

The housing 111 is a component configured to accommodate the electrode assembly 12. The housing 111 may be a hollow structure opened at one end, or, the housing 111 may be a hollow structure opened at two opposite ends. If the housing 111 is a hollow structure opened at one end, one end cap 112 may be disposed. If the housing 111 is a hollow structure opened at two opposite ends, two end caps 112 may be disposed. The two end caps 112 fit and cover the openings at the two ends of the housing 111 respectively. The housing 111 may be made of a variety of materials such as copper, iron, aluminum, steel, or an aluminum alloy. The housing 111 may be in various shapes such as a cylinder or cuboid. The shape of the housing 111 is determined depending on the shape of a combination of one or more electrode assemblies 12. For example, the housing 111 may be a hollow cuboid or cube or cylinder. One surface of the housing 111 is provided with an opening through which one or more electrode assemblies 12 can be placed into the housing 111 conveniently. For example, when the housing 111 is a hollow cuboid or cube, one of faces of the housing 111 is an opened face. The opened face is not walled so that the inside of the housing 111 communicates with the outside. When the housing 111 is a hollow cylinder, an end face of the housing 111 is opening face. That is, no wall is provided on this end face so that communication is implemented between inside and outside of the housing 111. The end cap 112 covers the opening and is connected to the housing 111 to form a closed cavity that is configured to accommodate the electrode assembly 12. As an example, in FIG. 1, the housing 111 is cuboidal, and the housing 111 is a hollow structure that opens at one end. Both the wall of the housing 111 and the end cap 112 are referred to as walls of the battery cell 10. For a cuboidal battery cell 10, the walls of the housing 111 include a bottom wall and four sidewalls. The housing 111 is filled with an electrolyte such as an electrolytic solution.

The end cap 112 is a component that fits and covers the opening of the housing 111 to isolate the internal environment of the battery cell 10 from the external environment. The shape of the end cap 112 may be adapted to the shape of the housing 111. As shown in FIG. 1, the housing 111 is a cuboidal structure, and the end cap 112 is a rectangular plate-shaped structure adapted to the housing 111. The end cap 112 may be made of a variety of materials such as copper, iron, aluminum, steel, or an aluminum alloy. The material of the end cap 112 may be identical to or different from the material of the housing 111.

The battery cell 10 may further include two electrode terminals 113. The two electrode terminals 113 may be disposed on the end cap 112. The two electrode terminals 113 are fixed onto a flat face in which the end cap 112 is located. The two electrode terminals 113 are a positive electrode terminal 113*a* and a negative electrode terminal 113*b* respectively. A connecting member 13, also referred to as a current collection component 13, is disposed corresponding to each electrode terminal 113, located between the end cap 112 and the electrode assembly 12, and configured to electrically connect the electrode assembly 12 and the electrode terminal 113.

The electrode assembly 12 is a component that reacts electrochemically in the battery cell 10. The electrode assembly 12 may be cylindrical, cuboidal, or the like. If the electrode assembly 12 is cylindrical, the housing 111 may be cylindrical accordingly. If the electrode assembly 12 is cuboidal, the housing 111 may be cuboidal accordingly. As shown in FIG. 1, each electrode assembly 12 includes a first tab 120*a* and a second tab 120*b*. The first tab 120*a* and the second tab 120*b* are of opposite polarities. For example, when the first tab 120*a* is a positive tab, the second tab 120*b* is a negative tab. The positive tab may be a stacked part, uncoated with the positive active material layer, on the positive electrode plate; and the negative tab may be a stacked part, uncoated with the negative active material layer, on the negative electrode plate. The first tabs 120*a* of one or more electrode assemblies 12 are connected to one electrode terminal by one connecting member 13. The second tabs 120*b* of one or more electrode assemblies 12 are connected to another electrode terminal by another connecting member 13. For example, the positive electrode terminal 113*a* is connected to the positive tab by one connecting member 13, and the negative electrode terminal 113*b* is connected to the negative tab by another connecting member 13.

In the battery cell 10, the number of electrode assemblies 12 in the housing 111 may be 1 or more, depending on actual needs. As an example shown in FIG. 1, 4 independent electrode assemblies 12 are disposed in the battery cell 10. The battery cell 10 shown in FIG. 1 is merely an example. In practical production, the shape of the battery cell 10 may vary depending on actual needs.

Figure 2:
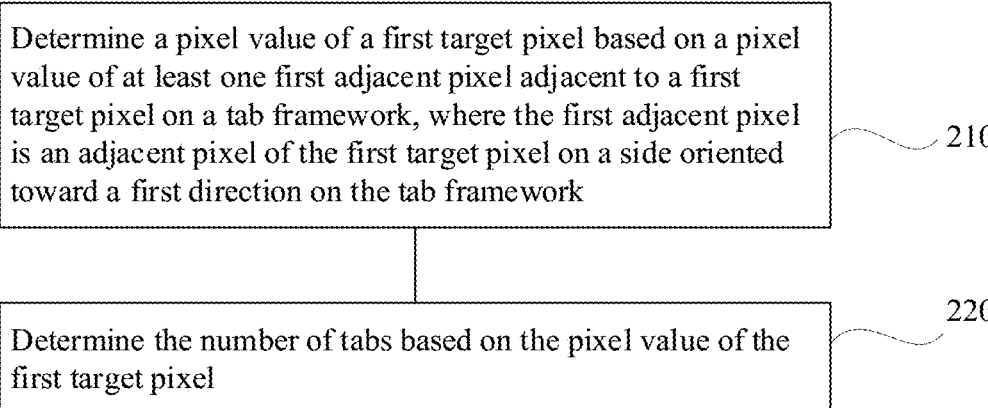
FIG. 2 shows a method for detecting a number of tabs according to an embodiment of this application.

FIG. 2 is a schematic block diagram of a method 200 for detecting a number of tabs according to an embodiment of this application. The method 200 includes at least the following steps:

S210: Determine a pixel value of a first target pixel based on a pixel value of at least one first adjacent pixel adjacent to a first target pixel on a tab framework, where the first adjacent pixel is an adjacent pixel of the first target pixel on a side in a first direction M on the tab framework; and S220: Determine the number of tabs based on the pixel value of the first target pixel.

In a process of detecting the number of tabs, the extracted tab framework may be analyzed. In an implementation, a first image may be acquired by photographing a tab on a production line. A framework map of the tab may be obtained by analyzing the first image. For example, the first image may be semantically segmented to obtain lines on the first image. The lines may be of a specific width. Each line is extracted with a width equal to one pixel to obtain a tab framework map.

Figure 3:
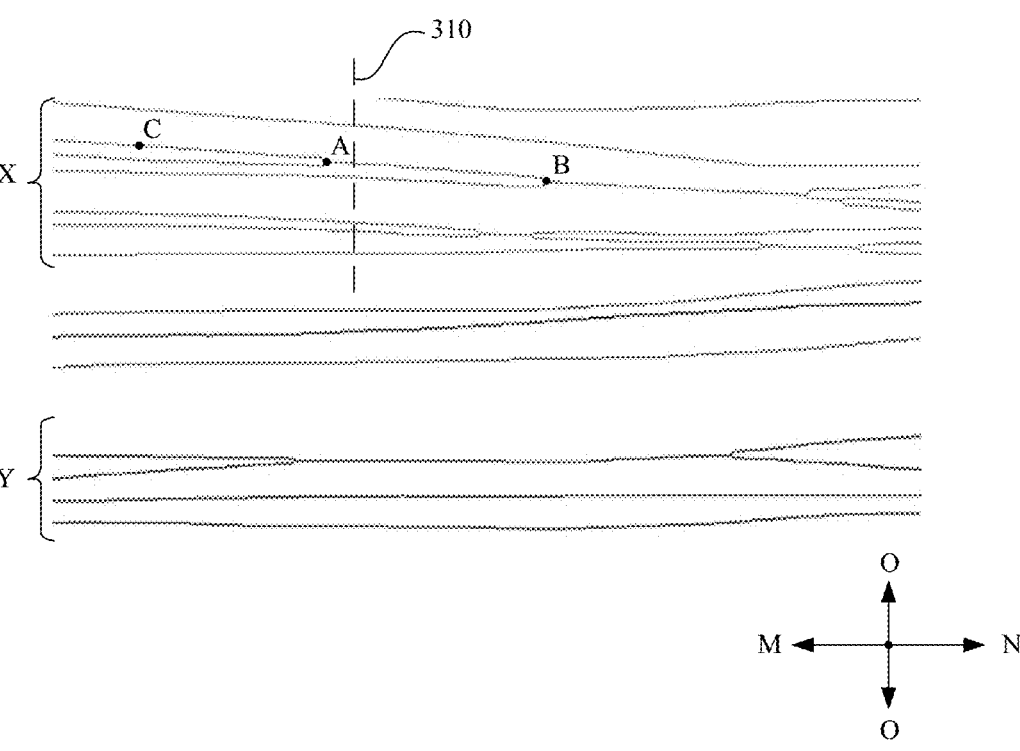
FIG. 3 is a schematic diagram of a tab framework according to an embodiment of this application.

The tab framework means a connected region in the tab framework map. The tab framework map corresponding to the battery cell may include at least one connected region. The connected region means a region containing the lines connected to each other in the tab framework map. For each connected region, the number of tabs may be detected by the method disclosed in this application. In this embodiment of this application, an example is described in which the tab framework map includes one connected region. As shown in FIG. 3, FIG. 3 is a part of a complete tab framework map, and includes a connected region X, a connected region Y, and lines in between. The three lines between the connected region X and the connected region Y are three connected regions respectively.

The first target pixel means a pixel with a pixel value to be determined on the tab framework. In an initial tab framework map, the pixel values of all foreground pixels are 1, and the pixel values of all background pixels are 0. A pixel value in the initial tab framework map just indicates whether a line exists at the pixel, but does not represent the number of tabs. Therefore, an actual pixel value of the first target pixel, that is, a pixel value that can represent the number of tabs, needs to be determined. The first target pixel may be an intersection on the tab framework, or any pixel that is not an intersection. Using the connected region X as an example, the first target pixel may be any pixel such as point A, point B, or point C in FIG. 3.

Figure 4:
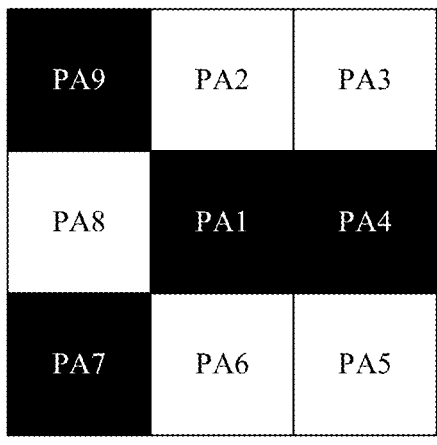
FIG. 4 is a schematic close-up view of a point A shown in FIG. 3 and pixels adjacent to the point.

The first adjacent pixel means a pixel adjacent to the first target pixel on the tab framework, and is located on a side of the first target pixel in the first direction M. Using an example in which point A in FIG. 3 is the first target pixel, as shown in FIG. 4, PA1 is a pixel at which point A is located, and PA2 to PA9 are pixels adjacent to point A, or in other words, eight pixels connected to point A. Among the eight pixels, the pixels located on the tab framework are PA9, PA7, and PA4. Among the three pixels, the pixels located on a side of PA1 in the first direction M are PA9 and PA7. Therefore, PA9 and PA7 are first adjacent pixels.

The first direction M may be any direction that uses PA1 as an endpoint. For example, considering that on the tab framework map, most of the tab extends in a horizontal direction of the image, the pixels on the side in the first direction M may be PA2, PA9, PA8, PA7, and PA6, and the pixels on a side in a third direction N may be PA3, PA4, and PA5. The third direction N is parallel to the first direction M and opposite to the first direction M. Optionally, the pixels on the side in the first direction M may be PA7 to PA9, and the pixels on the side in the third direction N may be PA2 to PA6. In a possible implementation, PA2, PA9, PA8, PA7, and PA6 may be initially used as pixels on the side in the first direction M, and PA2 to PA6 may be initially used as pixels on the side in the third direction N. Subsequently, it is determined whether the framework branches containing PA2 and PA6 are in the first direction M or the third direction N. Based on a result of such determining, it is determined whether PA2 and PA6 each are pixels on the side in the first direction M or on the side in the third direction N.

Using FIG. 3 and FIG. 4 as an example, in step S210, the pixel value of the first target pixel PA1 is determined based on the pixel values of the first adjacent target pixels PA9 and PA7. Specifically, the pixel values of PA9 and PA7 may represent the number of tabs represented by the lines containing the two pixels. When the line containing PA9 and the line containing PA7 "merge into" PA1 and "flow out" from PA4, the pixel values of PA9 and PA7 can be counted in the pixel value of PA1 in determining the pixel value of PA1. For example, the pixel values of PA9 and PA7 may be added together as the pixel value of PA1; or, the pixel values of PA9 and PA7 may be made to correspond to the pixel value of PA1 in the form of a matrix.

In step S220, the pixel value of PA1 determined based on PA9 and PA7 includes the number of tabs represented by the line containing PA9 and the line containing PA7. Therefore, the actual number of tabs can be determined based on the pixel value of PA1, thereby ensuring the accuracy of the number of tabs.

In this embodiment of this application, the number of tabs represented by the first target pixel is determined based on the pixel value of the first adjacent pixel. In this way, even if the tabs adhere to each other, the tabs can still be counted accurately, thereby ensuring accuracy of the detected number of tabs. By comparing the detected number of tabs with a preset number of tabs, a defect of tab folding into an electrode assembly and a defect of tab shortage can be detected, thereby ensuring a high pass rate of manufactured batteries. In addition, in a case of many tabs adhering to each other, the accurate number of tabs detected can avoid miscounting a qualified battery as unqualified due to an inaccurate detection result, thereby reducing the overkill rate in a defect detection process on the basis of ensuring high quality of manufactured batteries.

According to some embodiments of this application, optionally, a sum of pixel values of the at least one first adjacent pixel is used as the pixel value of the first target pixel.

Figure 5:
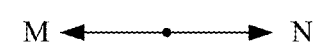
FIG. 5 is a schematic close-up view of a point C shown in FIG. 3 and pixels adjacent to the point.

Using FIG. 3 and FIG. 4 as an example, the pixel value of PA1 may be a sum of the pixel values of PA9 and PA7. For example, the number of tabs represented by the line PA9 and the number of tabs represented by the line PA7 are both 1. Therefore, the pixel value of PA9 and the pixel value of PA7 are both 1, and add up to 2 that is the pixel value of PA1, thereby determining that the number of tabs represented by the line containing PA1 is 2. In a case that the first target pixel is point C shown in FIG. 3, as shown in FIG. 5, the pixel value of PC8 is the pixel value of PC1.

In a possible implementation, when the pixel values of all the first adjacent pixels are 1, the pixel value of the first target pixel may be determined based on the number of the first adjacent pixels. That is, the pixel value of the first target pixel is the number of the first adjacent pixels.

By adding up the pixel values of all the first adjacent pixels, it is ensured that the pixel value of the first target pixel represents the actual number of tabs. Especially, in a case that the pixel value of the first adjacent pixel is greater than 1, the technical solution hereof avoids inaccuracy of detected number of tabs caused by miss detection of stuck tabs, and reduces the overkill rate in a defect detection process on the basis of ensuring high quality of manufactured batteries.

In a possible implementation, step S220 may specifically include: obtaining at least one tab calculation value, where the tab calculation value is a sum of pixel values of at least one first target pixel in a second direction O, and the second direction O is perpendicular to the first direction M; and determining the number of tabs based on a maximum tab calculation value among the at least one tab calculation value.

A process of counting the number of tabs for a single connected domain may be: on a straight line that extends along the second direction O, determining pixels that the straight line passes through, and calculating a sum of the values of the pixels as the number of tabs detected on the straight line, where the sum is the tab calculation value. A possible implementation, changes of $0 \rightarrow n \rightarrow 0$ may be detected on a straight line that extends along the second direction O, and all the n values may be added together as the number of tabs detected on the straight line. To ensure the accuracy of the number of tabs detected, a plurality of tab calculation values corresponding to the straight line that extends along the second direction O are usually obtained on the same connected region. The maximum value among the tab calculation values is used as the number of tabs detected on the connected region.

Using FIG. 3 as an example, when the first direction M is the negative direction of the abscissa axis, the second direction O may be a direction of an ordinate axis. The second direction O may be a direction without being specified as positive or negative. FIG. 3 shows a straight line 310 that extends along the second direction O. In this case, the straight line 310 passes through 6 pixels in the connected region X. Based on the method disclosed in this embodiment of this application, the pixel values of all the pixels between point A and point B are 2. Assuming that the pixel values of all other pixels on the straight line 310 are 1, the tab calculation value corresponding to the straight line 310 is 7.

In this way, the inaccurate counting of the tabs caused by the adhesion of tabs is avoided, and the accuracy of the detected number of tabs is improved.

According to some embodiments of this application, optionally, the first target pixel is an intersection on the tab framework. The method 200 further includes: assigning a value of 0 to the first adjacent pixel in a case that a framework branch containing the first adjacent pixel is not a tab.

In a method for detecting the number of tabs, the number of tabs represented by the pixels on the tab framework may be determined by starting from an intersection on the tab framework.

As can be seen from FIG. 3, a plurality of intersections exist in the connected region X. The intersections are usually formed due to adhesion of a plurality of tabs. Therefore, the calculation of the number of tabs is more prone to be inaccurate at the intersections of the tab framework. Each of the lines that intersect at the same point represents a framework branch. Using point A in FIG. 3 as an example, two framework branches extending in the first direction M intersect a framework branch extending in the third direction N at point A.

The tab framework map includes the lines that can represent the tabs, and may further include glitches caused by optical factors, foreign matters, image processing errors, or the like. The glitches also exist in the form of lines on the tab framework map. In other words, a framework branch on the tab framework map may represent a glitch instead of a tab. Therefore, by determining whether the framework branch containing the pixel is a tab, it is determined whether to count the framework branch into the number of tabs.

Specifically, using FIG. 3 and FIG. 4 as an example, if the framework branch containing the first adjacent pixel is a tab, for example, if the framework branch containing PA9 is a tab, then the pixel value of PA9 can represent the number of tabs, and the pixel value of PA9 needs to be considered during determining of the pixel value of the first target pixel PA1 If the framework branch containing the first adjacent pixel is not a tab, for example, if the framework branch containing PA7 is not a tab, then the pixel value of PA7 cannot represent the number of tabs, and the pixel value of PA7 needs to be excluded during determining of the pixel value of the first target pixel PA1. In a possible implementation, the pixel of PA7 may be modified to 0. Therefore, in determining the pixel value of PA1, the pixel value of PA7 does not affect the actual number of tabs.

Optionally, the first target pixel may be a leftmost intersection on the tab framework, so as to make it convenient to sequentially update the pixel values of the pixels on the tab framework in a specific direction.

The pixel value of the first adjacent pixel is counted in the number of tabs only when it is determined that the framework branch containing the first adjacent pixel is a tab, so that glitches caused by optical factors, foreign matters, or other reasons are prevented from affecting the tab count result, thereby improving the accuracy of defect detection of the tabs.

According to some embodiments of this application, optionally, the method 200 may further include: determining a first length by which the framework branch containing the first adjacent pixel extends along the first direction M; and determining, in a case that the first length is greater than or equal to a first threshold, that the framework branch containing the first adjacent pixel is a tab; or, determining, in a case that the first length is less than a first threshold, that the framework branch containing the first adjacent pixel is not a tab.

In an implementation of an embodiment of this application, whether the framework branch containing the first adjacent pixel is a tab may be determined by obtaining the length of the framework branch.

Compared with a line that represents a tab, a glitch is usually shorter in length. Therefore, whether the framework branch is a tab may be determined by determining the first length by which the framework branch containing the first adjacent pixel extends along the first direction M. A specific determining process may be: determining, in a case that the first length is greater than or equal to a first threshold, that the framework branch containing the first adjacent pixel is a tab; or, determining, in a case that the first length is less than a first threshold, that the framework branch containing the first adjacent pixel is not a tab.

Extending along the first direction M means that the framework branch always faces the same direction. For example, the first adjacent pixel PA9 is located on a side of the first target pixel PA1 in the first direction M. If the pixels on the tab framework containing PA9 except endpoints include the pixel on the side in the first direction M, then it is determined that the tab framework containing PA9 extends along the first direction M.

The determining, based on the first length, whether the framework branch containing the first adjacent pixel is qualified to represent a tab can simply and quickly exclude the glitches on the tab framework, avoid counting the glitches into the number of tabs, and ensure accuracy of the detected number of tabs.

According to some embodiments of this application, optionally, the first direction M is a negative direction of the abscissa axis. The determining a first length by which the framework branch containing the first adjacent pixel extends along the first direction M may specifically include: increasing the first length by 1 in a case that pixels adjacent to the first adjacent pixel include a third adjacent pixel, and using the third adjacent pixel as a next first adjacent pixel, where an abscissa of the third adjacent pixel is less than or equal to an abscissa of the first adjacent pixel, and a pixel value of the third adjacent pixel is 1; and obtaining the first length between the first adjacent pixel and the first target pixel in a case that the pixels adjacent to the first adjacent pixel include no third adjacent pixel.

Figure 7:
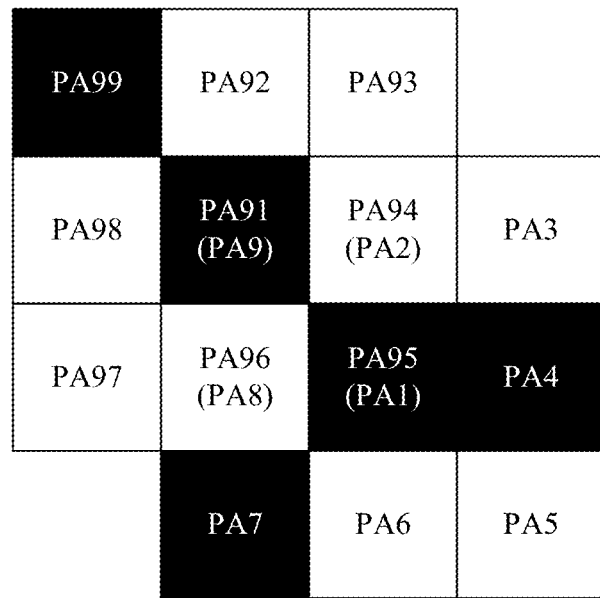
FIG. 7 is a schematic close-up view of pixels PA1 and PA9 shown in FIG. 4 and pixels adjacent to the two pixels.
Figure 7:
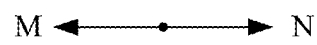

For example, as shown in FIG. 7, the first adjacent pixel PA9 is located on a side of the first target pixel PA1 in the first direction M. Therefore, using PA9 as a first target pixel, the first adjacent pixel PA99 located on the tab framework is found by traversing the pixels adjacent to PA9 on a side of PA9 in the first direction M. If the pixel value of PA99 is 1, it indicates that PA99 is located on the tab framework.

Subsequently, by using PA99 as the first target pixel, all the pixels adjacent to PA99 and with a pixel value of 1 are further traversed on a side of PA99 in the first direction M. The foregoing process goes on cyclically until no first adjacent pixel exists or a plurality of first adjacent pixels exist on a side of a specified first target pixel in the first direction M. Understandably, if PA9 is still referred to as the first adjacent pixel, then PA99 may be referred to as a third adjacent pixel, and the foregoing process goes on cyclically until the end of the cycling.

In a possible implementation, the first direction M is a negative direction of the abscissa axis. In this case, a third adjacent pixel with an abscissa less than or equal to the abscissa of the first adjacent pixel may be deemed to be a pixel on a side of the first adjacent pixel in the first direction M.

A distance between the first adjacent pixel and the first target pixel is 1. A distance between the third adjacent pixel and the first adjacent pixel is also 1. Therefore, every time a third adjacent pixel is detected, the first length increases by 1 until the end of the cycling, so as to obtain the value of the first length. The first length means a distance between the first one of the first adjacent pixels and the last one of the first adjacent pixels on a framework branch.

In a case that no third adjacent pixel exists on a side of a specified first adjacent pixel in the first direction M, the specified first adjacent pixel is an endpoint on the framework branch, and the cycling ends, so as to obtain a first distance between the specified first adjacent pixel and the first one of the first adjacent pixels on the framework branch.

In a case that a plurality of first adjacent pixels exist on a side of a specified first adjacent pixel in the first direction M, it indicates that the specified first adjacent pixel is an intersection on the tab framework. An intersection is usually a part of a tab. Therefore, in this case, the cycling ends without recording the first distance, and it is considered that the framework branch represents a tab.

Optionally, in order to avoid affecting the updated pixel value in the process of determining whether the framework branch containing the first adjacent pixel is a tab, the determining process may be performed on a copy of the tab framework map, and then the pixel value of the pixel is updated on the original tab framework map based on the determining result. In other words, in the method for detecting the number of tabs according to this application, all the updated pixel values on the original tab framework map represent the actual number of tabs. If other determining processes need to be performed by changing the pixel value, the pixel value may be changed on the copy of the tab framework map.

In this way, the length by which the framework branch containing the first adjacent pixel extends along the first direction M can be obtained by a simple cyclic process, thereby improving the efficiency of detecting the number of tabs.

According to some embodiments of this application, optionally, the first direction M is a negative direction of the abscissa axis. The determining whether the framework branch containing the first adjacent pixel is a tab may specifically include: determining a second length between a third adjacent pixel and the first adjacent pixel, where the third adjacent pixel is adjacent to the first adjacent pixel, an abscissa of the third adjacent pixel is less than or equal to an abscissa of the first adjacent pixel, and a pixel value of the third adjacent pixel is 1; and using the third adjacent pixel as a next first adjacent pixel in a case that the second length is less than a second threshold and pixels adjacent to the first adjacent pixel include the third adjacent pixel; and determining, in a case that the second length is less than a second threshold and the pixels adjacent to the first adjacent pixel include no third adjacent pixel, that the framework branch is not a tab; and, determining, in a case that the second length is greater than or equal to the second threshold, that the framework branch is a tab.

In another implementation of this embodiment of this application, a second length between the third adjacent pixel and the first adjacent pixel may be obtained. If the second length is less than the second threshold, the process goes on to obtain a second length between a next third adjacent pixel and the first adjacent pixel. If the framework branch ends when the second length still does not reach the second threshold, it is determined that the framework branch is not a tab. If the second length between a specified third adjacent pixel and the first adjacent pixel is greater than or equal to the second threshold, it is determined that the framework branch is a tab.

Using FIG. 7 as an example, PA9 is a first adjacent pixel and PA99 is a third adjacent pixel. Therefore, the second length between PA99 and PA9 is 1. The second length is compared with the second threshold. For example, if the second threshold is 10, the second length is less than the second threshold. Using PA99 as a next first adjacent pixel, the second length between PA9 and the third adjacent pixel of PA99 on a side in the first direction M is 2, still being less than the second threshold. By analogy, when the second length between a third adjacent pixel and PA9 is 10, it is determined that the framework branch containing PA9 represents a tab. When the second length between a third adjacent pixel and PA9 is 9, and no foreground pixel exists on a side of the third adjacent pixel in the first direction M, it indicates that the framework branch has ended. In this case, it is determined that the framework branch is not a tab.

In these embodiments of this application, without a need to traverse all the pixels on the tab framework, it is determined whether the framework branch containing the pixel adjacent to the first target pixel represents a tab, thereby reducing the number of cycles, saving the time of data processing, and improving the efficiency of detecting the number of tabs.

According to some embodiments of this application, optionally, the method 200 may further include: using a second adjacent pixel adjacent to the first target pixel on the tab framework as a next first target pixel, where the second adjacent pixel is an adjacent pixel of the first target pixel on a side in a third direction N on the tab framework; and the third direction N is parallel to the first direction M and opposite to the first direction M.

Figure 6:
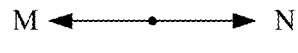
FIG. 6 is a schematic close-up view of pixels PA1 and PA4 shown in FIG. 4 and pixels adjacent to the two pixels.
Figure 6:
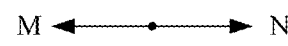

The second adjacent pixel means a pixel located on a side opposite to the side on which the first adjacent pixel is located, among the pixels adjacent to the first target pixel on the tab framework. Using FIG. 6 as an example, PA4 is the second adjacent pixel. Using PA4 as a next first target pixel denoted by PA41, the second adjacent pixel corresponding to PA41 is PA44. In a possible implementation, the pixel value of PA1 may be assigned to PA4. When PA4 (PA41) is used as a first target pixel, the pixel value of PA4 is assigned to PA44. By analogy, all the pixels on the framework branch containing PA4 may be traversed. Therefore, the pixel values of all the pixels on the framework branch containing PA4 can represent the actual number of tabs.

In another method for detecting the number of tabs, the number of tabs represented by the pixels on the tab framework may be determined by starting from any point on the tab framework. For example, in a case that the first target pixel is not an intersection on the tab framework, the number of tabs represented by the pixels on the tab framework may be determined by starting from the first target pixel.

For example, using point C as a first target pixel, only one first adjacent pixel exists on a side of point C in the first direction M; and only one second adjacent pixel exists on a side of point C in the third direction N. Therefore, a sum of the pixel values of the first adjacent pixels may be used as a pixel value of the first target pixel. Further, the second adjacent pixel is used as a next first target pixel. Therefore, a sum of the pixel values of the original first target pixels, that is, the new first adjacent pixels, is used as the pixel value of the new first target pixel. Alternatively, the above process may be regarded as assigning the pixel value of the first adjacent pixel to the first target pixel and then assigning the pixel value of the first target pixel to the second adjacent pixel. By analogy, the pixel value of each pixel on the tab framework is updated, so that each pixel can represent the actual number of tabs at this pixel.

In a possible implementation, the pixel value of the first target pixel may be assigned to the second adjacent pixel under the following conditions: the framework branch containing the first adjacent pixels is a tab; the number of the first adjacent pixels is greater than or equal to 1; and the number of the second adjacent pixels is equal to 1.

In the tab framework, a plurality of tabs may adhere together into one line, and one line may be split into a plurality of tabs. In a case that the lines in the tab framework can represent tabs, the number of tabs is prone to be inaccurate when a plurality of tabs adhere together into one line. However, one line split into a plurality of tabs is conducive to accurate detection of the number of tabs. Therefore, the actual number of tabs may be determined by considering just the circumstance of a plurality of tabs adhering together into one line.

Specifically, in a process of traversing the pixels around the first target pixel, in a case that at least one framework branch "merges into" the first target pixel and only one frame branch "flows out" of the first target pixel, the pixel value of the first target pixel is assigned to the second adjacent pixel. In other words, the number of tabs actually represented by the framework branch containing the second target pixel is recorded on this framework branch.

By using the second adjacent pixel as the next first target pixel, the pixels on the tab framework are detected sequentially along the third direction N. In this way, the number of tabs located on one side of the first target pixel in the first direction M can be counted cumulatively into a pixel on the framework branch containing the second adjacent pixel, thereby improving the accuracy of the detected number of tabs. In addition, by traversing all the pixels on the tab framework except intersections, the number of tabs represented by the pixel value of each pixel on the tab framework is the actual number of tabs, thereby ensuring the accuracy of the detected number of tabs. In addition, in a case that some tabs adhere to each other, the number of tabs that "merge into" the first target pixel is counted into the number of tabs of a second adjacent pixel that "flow out" of the first target pixel point, thereby ensuring the accuracy of the detected number of tabs.

According to some embodiments of this application, optionally, the third direction N is a positive direction of an abscissa axis. An abscissa of the second adjacent pixel is greater than or equal to an abscissa of the first target pixel.

As can be seen from FIG. 3 to FIG. 7, in a case that the third direction N is the positive direction of the abscissa axis, the second adjacent pixel may be regarded as an adjacent pixel located to the right side of the first target pixel on the tab framework. In a possible implementation, the pixels on the tab framework may be traversed along the third direction N.

Similar to the case of the first adjacent pixel, the framework branch containing the second adjacent pixel may be checked to determine whether the framework branch is a tab, so as to prevent glitches from interfering with detection of the number of tabs.

In an implementation of this embodiment of this application, a length by which the framework branch containing the second adjacent pixel extends along the third direction N may be determined. In a case that the length is greater than or equal to a specified threshold, it is determined that the framework branch containing the second adjacent pixel is a tab; or, in a case that the length is less than a specified threshold, it is determined that the framework branch containing the second adjacent pixel is not a tab.

In another implementation of this embodiment of this application, a length between the second adjacent pixel and a pixel on a framework branch containing the second adjacent pixel may be obtained. If the length is less than a specified threshold, the process goes on to obtain a length between a next pixel and the second adjacent pixel. If the framework branch ends when the length still does not reach the specified threshold, it is determined that the framework branch is not a tab. If the length between a specified pixel and the second adjacent pixel is greater than or equal to the second threshold, it is determined that the framework branch is a tab.

In these embodiments of this application, the orientation of a pixel can be determined based on the value of the abscissa. In a process of traversing the pixels, the pixels can be traversed along a specific direction, so that the pixel value of the pixel on the tab framework represents the actual number of tabs, thereby improving the accuracy of detecting the number of tabs.

This application further provides a device for detecting a number of tabs. The device includes a processing module. The processing module may be a processor. The processing module is configured to: determine a pixel value of a first target pixel based on a pixel value of at least one first adjacent pixel adjacent to a first target pixel on a tab framework, where the first adjacent pixel is an adjacent pixel of the first target pixel on a side in a first direction on the tab framework. The processing module is further configured to determine the number of tabs based on the pixel value of the first target pixel.

According to some embodiments of this application, optionally, the processing module is configured to use a sum of pixel values of the at least one first adjacent pixel as the pixel value of the first target pixel.

According to some embodiments of this application, optionally, the processing module is configured to obtain at least one tab calculation value, where the tab calculation value is a sum of pixel values of the first target pixels in a second direction, and the second direction is perpendicular to the first direction. The processing module is further configured to determine the number of tabs based on a maximum tab calculation value among the at least one tab calculation value.

According to some embodiments of this application, optionally, the processing module is configured to assign a value of 0 to the first adjacent pixel in a case that a framework branch containing the first adjacent pixel is not a tab.

According to some embodiments of this application, optionally, the processing module is configured to determine a first length by which the framework branch containing the first adjacent pixel extends along the first direction. The processing module is further configured to determine, in a case that the first length is greater than or equal to a first threshold, that the framework branch containing the first adjacent pixel is a tab; or, the processing module is configured to determine, in a case that the first length is less than a first threshold, that the framework branch containing the first adjacent pixel is not a tab.

According to some embodiments of this application, optionally, the processing module is configured to increase the first length by 1 in a case that pixels adjacent to the first adjacent pixel include a third adjacent pixel, and use the third adjacent pixel as a next first adjacent pixel, where an abscissa of the third adjacent pixel is less than or equal to an abscissa of the first adjacent pixel, and a pixel value of the third adjacent pixel is 1. The processing module is further configured to obtain the first length between the first adjacent pixel and the first target pixel in a case that the pixels adjacent to the first adjacent pixel include no third adjacent pixel.

According to some embodiments of this application, optionally, the processing module is configured to determine a second length between a third adjacent pixel and the first adjacent pixel, where the third adjacent pixel is adjacent to the first adjacent pixel, an abscissa of the third adjacent pixel is less than or equal to an abscissa of the first adjacent pixel, and a pixel value of the third adjacent pixel is 1. The processing module is further configured to use the third adjacent pixel as a next first adjacent pixel in a case that the second length is less than a second threshold and pixels adjacent to the first adjacent pixel include the third adjacent pixel. The processing module is further configured to determine, in a case that the second length is less than a second threshold and the pixels adjacent to the first adjacent pixel include no third adjacent pixel, that the framework branch is not a tab. The processing module is further configured to determine, in a case that the second length is greater than or equal to the second threshold, that the framework branch is a tab.

According to some embodiments of this application, optionally, the processing module is configured to use a second adjacent pixel adjacent to the first target pixel on the tab framework as a next first target pixel. The second adjacent pixel is an adjacent pixel of the first target pixel on a side in a third direction on the tab framework. The third direction is parallel to the first direction and opposite to the first direction.

According to some embodiments of this application, optionally, the third direction is a positive direction of an abscissa axis. An abscissa of the second adjacent pixel is greater than or equal to an abscissa of the first target pixel.

Figure 8:
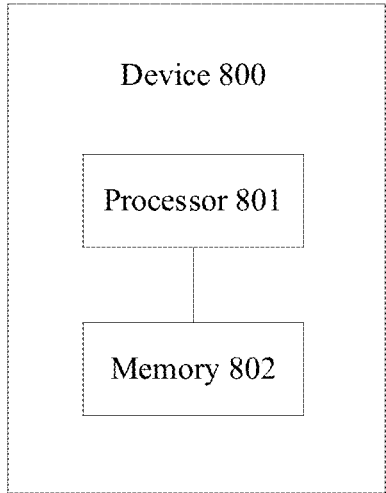
FIG. 8 is a schematic diagram of a device for detecting a number of tabs according to an embodiment of this application.

This application further provides a device 800 for detecting a number of tabs. As shown in FIG. 8, the device includes a processor 801 and a memory 802. The memory 802 stores an instruction. When executed by the processor 801, the instruction causes the device 800 to perform the method according to any one of the embodiments described above.

This application further provides a computer-readable storage medium. The computer-readable storage medium stores a computer program. When executed, the computer program performs the method according to any one of the embodiments in the first aspect.

Although this application has been described with reference to illustrative embodiments, various improvements may be made to the embodiments without departing from the scope of this application, and the components in this application may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A method for detecting a number of tabs, comprising:
determining a pixel value of a first target pixel based on at least one pixel value of at least one first adjacent pixel adjacent to a first target pixel on a tab framework, wherein each of the at least one first adjacent pixel is an adjacent pixel of the first target pixel on a side in a first direction on the tab framework;
determining the number of tabs based on the pixel value of the first target pixel, the first target pixel being an intersection on the tab framework; and
for one first adjacent pixel of the at least one first adjacent pixel, assigning a value of 0 to the one first adjacent pixel in response to a framework branch containing the one first adjacent pixel being not a tab.

2. The method according to claim 1, wherein determining the pixel value of the first target pixel comprises:
using a sum of the at least one pixel value of the at least one first adjacent pixel as the pixel value of the first target pixel.

3. The method according to claim 1, wherein:
the first target pixel is one of at least one first target pixel; and
determining the number of tabs comprises:
obtaining at least one tab calculation value, wherein each of the at least one tab calculation value is a sum of one or more pixel values of one or more of the at least one first target pixel in a second direction, and the second direction is perpendicular to the first direction; and
determining the number of tabs based on a maximum tab calculation value among the at least one tab calculation value.

4. The method according to claim 1, further comprising:
determining a first length by which the framework branch containing the one first adjacent pixel extends along the first direction; and
determining whether the framework branch containing the one first adjacent pixel is a tab based on the first length, comprising:
determining, in response to the first length being greater than or equal to a first threshold, that the framework branch containing the one first adjacent pixel is a tab; or
determining, in response to the first length being less than the first threshold, that the framework branch containing the one first adjacent pixel is not a tab.

5. The method according to claim 4, wherein the first direction is a negative direction of an abscissa axis, and determining the first length comprises:
in response to pixels adjacent to the one first adjacent pixel comprising another adjacent pixel, increasing the first length by 1 and using the another adjacent pixel as a next first adjacent pixel, wherein an abscissa of the another adjacent pixel is less than or equal to an abscissa of the one first adjacent pixel, and a pixel value of the another adjacent pixel is 1; and obtaining the first length between the one first adjacent pixel and the first target pixel in response to the pixels adjacent to the one first adjacent pixel comprising no other adjacent pixel.

6. The method according to claim 1, wherein the first direction is a negative direction of an abscissa axis, and determining whether the framework branch containing the one first adjacent pixel is a tab comprises:
determining a length between another adjacent pixel and the one first adjacent pixel, wherein the another adjacent pixel is adjacent to the one first adjacent pixel, an abscissa of the another adjacent pixel is less than or equal to an abscissa of the one first adjacent pixel, and a pixel value of the another adjacent pixel is 1; and
using the another adjacent pixel as a next first adjacent pixel in response to the length being less than a threshold and pixels adjacent to the one first adjacent pixel comprising the another adjacent pixel; and
determining, in response to the length being less than the threshold and the pixels adjacent to the one first adjacent pixel comprising no other adjacent pixel, that the framework branch is not a tab; and
determining, in response to the length being greater than or equal to the threshold, that the framework branch is a tab.

7. The method according to claim 1, further comprising:
using a second adjacent pixel adjacent to the first target pixel on the tab framework as a next first target pixel, wherein the second adjacent pixel is an adjacent pixel of the first target pixel on a side in another direction on the tab framework, and the another direction is parallel to the first direction and opposite to the first direction.

8. The method according to claim 7, wherein the another direction is a positive direction of an abscissa axis, and an abscissa of the second adjacent pixel is greater than or equal to an abscissa of the first target pixel.

9. A device for detecting a number of tabs, comprising:
a processing module, configured to perform the method according to claim 1.

10. A device for detecting a number of tabs, comprising:
a processor and a memory, wherein the memory stores an instruction, and, when executed by the processor, the instruction causes the device to perform the method according to claim 1.

11. A non-transitory computer-readable storage medium, wherein the computer-readable storage medium stores a computer program, and, when executed, the computer program causes a processor to perform the method according to claim 1.

12. A method for detecting a number of tabs, comprising:
determining a pixel value of a first target pixel based on at least one pixel value of at least one first adjacent pixel adjacent to a first target pixel on a tab framework, wherein each of the at least one first adjacent pixel is an adjacent pixel of the first target pixel on a side in a first direction on the tab framework;
determining the number of tabs based on the pixel value of the first target pixel; and
using a second adjacent pixel adjacent to the first target pixel on the tab framework as a next first target pixel, wherein the second adjacent pixel is an adjacent pixel of the first target pixel on a side in another direction on the tab framework, and the another direction is parallel to the first direction and opposite to the first direction.

* * * * *